United States Patent
Born et al.

[11] Patent Number: 6,131,108
[45] Date of Patent: Oct. 10, 2000

[54] APPARATUS, AND ASSOCIATED METHOD, FOR GENERATING MULTI-BIT LENGTH SEQUENCES

[75] Inventors: Richard M. Born, Fort Collins; Timothy D. Thompson, Windsor, both of Colo.

[73] Assignee: LSI Logic Corporation, Milpitas, Calif.

[21] Appl. No.: 09/052,890

[22] Filed: Mar. 31, 1998

[51] Int. Cl.[7] ........................................... G06F 7/50
[52] U.S. Cl. ............................. 708/670; 711/220
[58] Field of Search ........................... 708/490, 670, 708/700; 711/220

[56] References Cited

U.S. PATENT DOCUMENTS

| | | | |
|---|---|---|---|
| 3,768,077 | 10/1973 | Nier et al. | 340/172.5 |
| 4,627,021 | 12/1986 | Persoon et al. | 364/900 |
| 4,831,570 | 5/1989 | Abiko | 708/670 |
| 4,884,231 | 11/1989 | Mor et al. | 364/736 |
| 4,992,934 | 2/1991 | Portanova et al. | 364/200 |
| 5,123,108 | 6/1992 | Olson et al. | 395/800 |
| 5,168,571 | 12/1992 | Hoover et al. | 395/800 |
| 5,233,553 | 8/1993 | Shak et al. | 708/670 |
| 5,287,532 | 2/1994 | Hunt | 395/800 |
| 5,612,911 | 3/1997 | Timko | 708/670 |
| 5,961,580 | 10/1999 | Mahlingaiah | 708/670 |

*Primary Examiner*—Tan V. Mai
*Attorney, Agent, or Firm*—Christopher P. Maiorana

[57] ABSTRACT

Apparatus, and an associated method, for generating multi-bit sequences used, for instance, to form an address pointer or a data pointer of a computer system. The circuitry is embodied in a single-cycle path and is operable to generate an output sequence which is of a bit length which is a multiple of an input sequence. In one implementation, the circuitry is used to generate 48-bit address pointers and 16-bit data pointers.

17 Claims, 2 Drawing Sheets

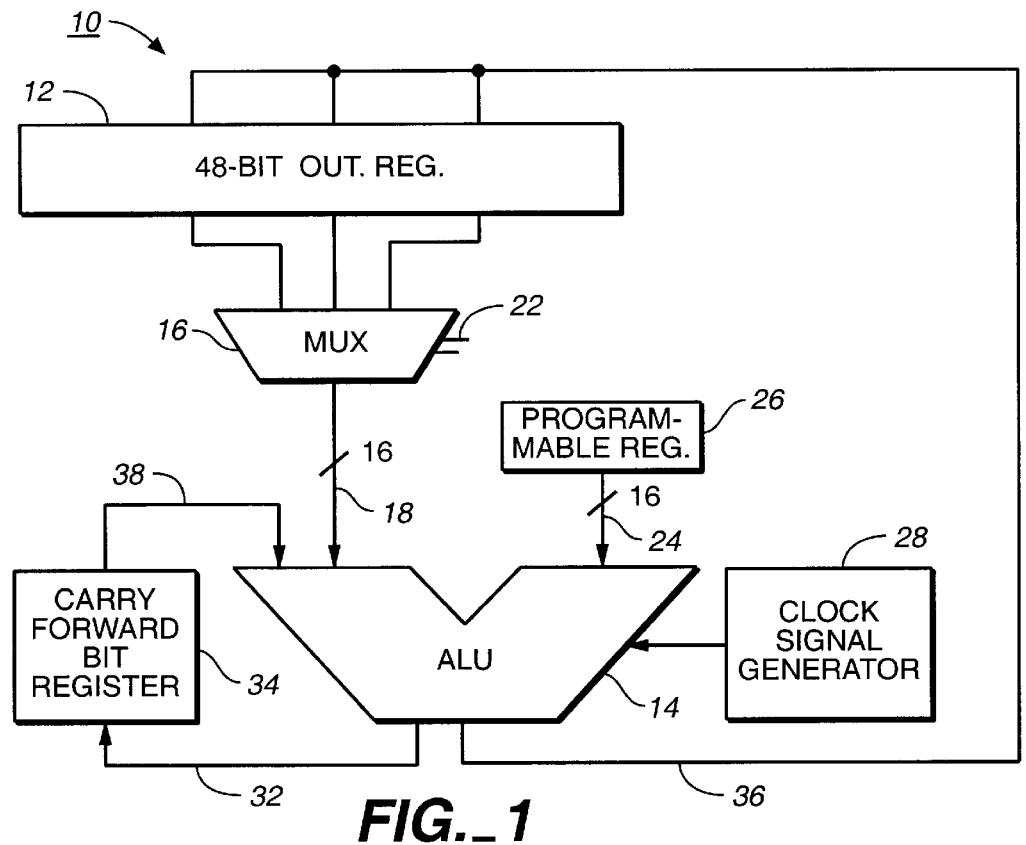
FIG._1
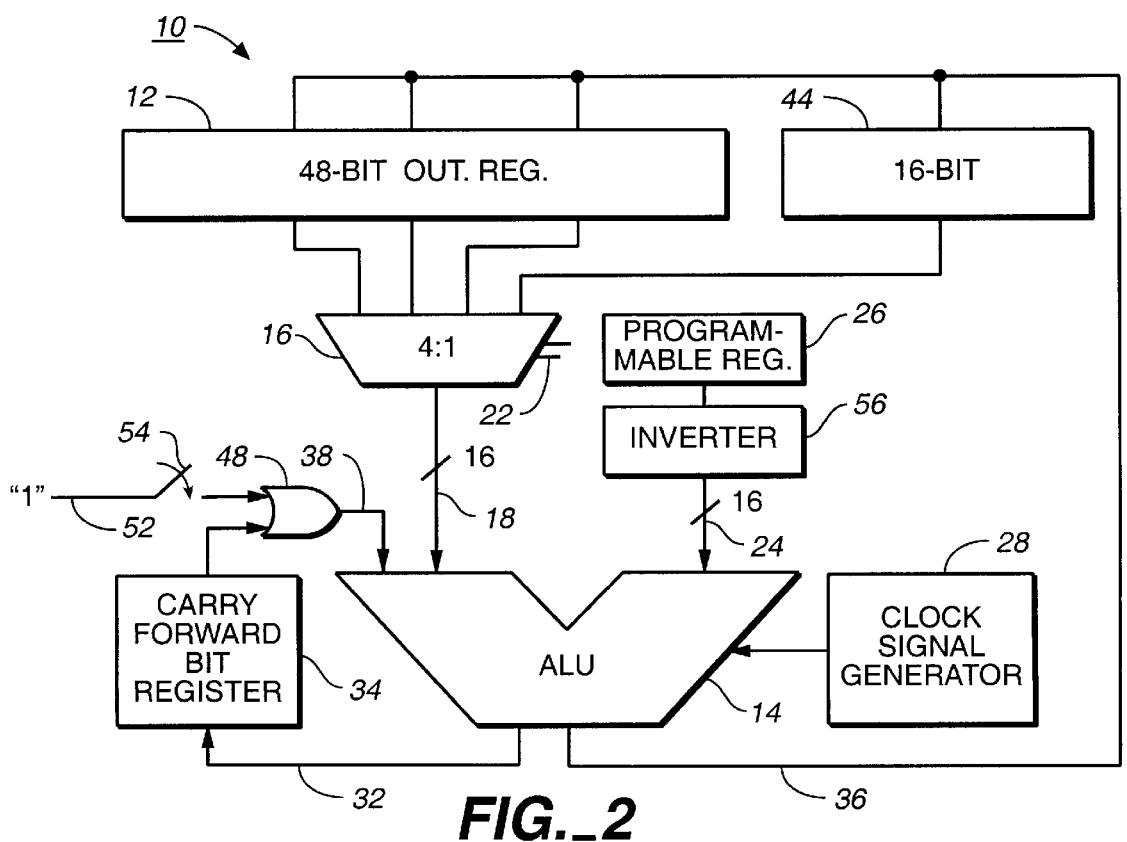
FIG._2

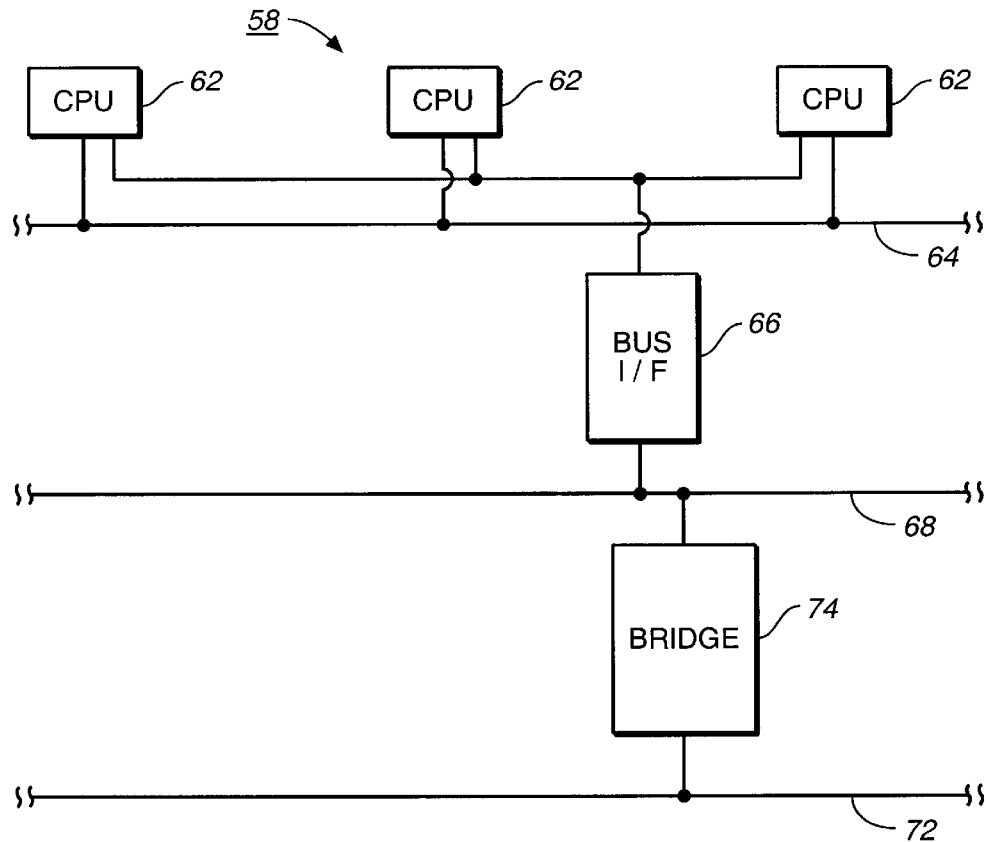
FIG._3
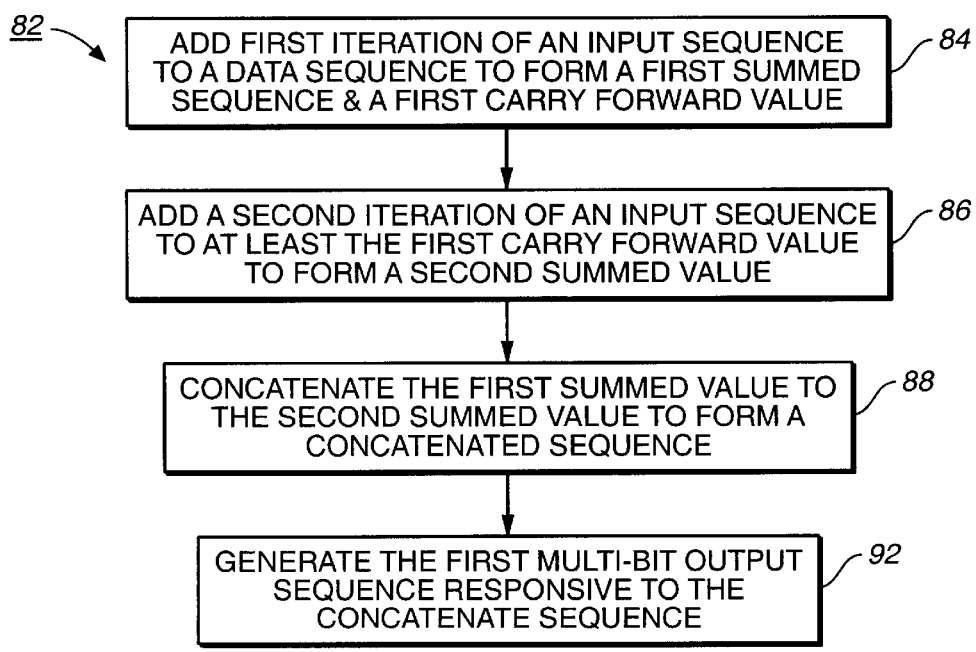
FIG._4

APPARATUS, AND ASSOCIATED METHOD, FOR GENERATING MULTI-BIT LENGTH SEQUENCES

The present invention relates, generally to apparatus for generating a multi-bit output sequence, such as a sequence forming an address pointer or a data pointer. More particularly, the present invention relates to circuitry, and an associated method, operable to form a multi-bit output sequence which is a multiple of an input sequence. The circuitry is operable at a fixed frequency, such as that used by an ASIC (application specific integrated circuit).

The circuitry is embodied in a single-cycle path which avoids the complexity associated with multi-cycle path implementations, conventionally needed to form large, multi-bit sequences. Because an output sequence can be generated which is of a bit length multiple times, in bit length, that of an input sequence used to form the output sequence, advantageous use is made of circuit repetition of common circuit elements, thereby to reduce circuit size and complexity.

In one implementation, the circuitry is used to generate 48-bit address pointers and 16-bit data pointers using only single cycle paths.

BACKGROUND OF THE INVENTION

Digital processing circuitry and apparatus, including such circuitry, is pervasive in modern society. The use of digital processing circuitry is advantageous as repetitive functions can be carried out at rates dramatically more quickly than that which can be performed manually. And, because of the rapid speed at which the operations can be performed, activities previously impractical have been readily implemented. The use of digital processing circuitry advantageously permits the processing of large amounts of data. For instance, in a computer system, data is transferred between peripheral devices, and between peripheral devices and a CPU (central processing unit). In such processing of data, data is read from, or written to, data storage, and other locations in successive read and write operations.

In order to carry out the read and write operations, the location of the data to be retrieved in a read operation and the destination to which the data is to be written must be identified. Such locations are sometimes identified by addresses which point to such locations. Such indications are referred to as address pointers. The addresses are sequences of binary bits. In some computer systems, the sequences are fairly lengthy, for example, of 48-bit, bit lengths.

During operation of a computer system, or other system incorporating digital processing circuitry, successive, and non-sequential address locations might need to be accessed at high speeds. Providing the sequences forming the addresses needed to perform the data processing functions becomes unwieldy when the lengths of the address are of lengthy bit lengths.

One conventional manner by which to generate the addresses is to utilize an arithmetic logic unit (ALU) of a bit-size corresponding to the bit lengths of the addresses to be generated. However, such conventional circuitry is of complex construction and requires multi-cycle paths for effectuation. Because of such complexity and the need for multi-cycle paths to effectuate the formation of the bit sequences, the costs of implementing such circuitry is relatively high. When such sequences are to be generated with, e.g., an ASIC (application specific integrated circuit), the circuitry must be operated at a fixed frequency. Existing manners by which to form a lengthy sequence of bits based on combinations of smaller function mechanisms typically permit scaling of clock frequencies of circuitry to implement such functions.

A manner by which better to provide for the formation of bit sequences, such as those used to form address or data pointers, utilizing less complex circuitry would therefore be advantageous.

It is in light of this background information related to digital processing circuitry that the significant improvements of the present invention have evolved.

SUMMARY OF THE INVENTION

The present invention, accordingly, advantageously provides circuitry, and an associated method, which generates multi-bit output sequences of bit lengths which are multiples of input sequences provided thereto. Because the output sequence can be formed responsive to application to the circuitry of a smaller-bit sequence, the complexity of the circuitry required to form the output sequence is simplified relative to conventional manners by which to form the multi-bit output sequences.

The circuitry is embodied in a single-cycle path, further to lessen the complexity of the circuitry relative to conventional manners by which to form the output sequences. The circuitry is further operable at a fixed frequency and can be implemented, e.g., by an ASIC.

In one implementation, the circuitry is used to generate 48-bit address pointers and 16-bit data pointers using only single-cycle paths. Common circuitry is utilized to form both sequences. The circuitry so-formed, for instance, forms a portion of a bridge interconnecting separate data buses, such as an ATA and a 1394 bus of a computer system. The circuitry is of simplified construction relative to conventional circuitry, requiring only single-cycle paths for effectuation.

In these and other aspects, therefore, circuitry, and an associated method, is provided for generating at least a first multi-bit output sequence of a first selected number of bits responsive to an input-sequence of a second selected number of bits. The first selected number of bits is a multiple of the second selected number of bits. An arithmetic logic unit is coupled to receive a first iteration of the input sequence and at least a second iteration of the input sequence. The arithmetic logic unit is further coupled to receive a data sequence wherein the data sequence is also of the second selected number of bits. The arithmetic logic unit adds the first iteration of the input sequences together with the data sequence to form a first summed value and a first carry-forward value. Thereafter, the arithmetic logic unit is further operable at least to add the second iteration of the input sequence at least with the first carry-forward value to form a second summed value. The first summed value is concatenated to the second summed value to form the first multi-bit output sequence.

The present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 1 illustrates a functional block diagram of the circuitry of an embodiment of the present invention.

FIG. 2 illustrates a functional block diagram, similar to that shown in FIG. 1, but of an alternate embodiment of the present invention.

FIG. 3 illustrates a functional block diagram of a computer system in which an embodiment of the present invention is implemented.

FIG. 4 illustrates a method flow diagram listing the method steps of the method of operation of an embodiment of the present invention.

DETAILED DESCRIPTION

FIG. 1 illustrates the circuitry, shown generally at 10, of an embodiment of the present invention. The circuitry 10 is operable to generate a multi-bit output sequence of a desired bit-length. In the exemplary embodiment, the circuitry 10 is operable to generate output sequences of 48-bit lengths which are provided to an output register 12. The sequence stored in the output register 12 is accessed to form, for instance, values of an address pointer. And, portions of the sequences stored in the output register 12 are used to generate subsequent values of the multi-bit sequence.

As illustrated, the output register 12 is coupled to an ALU (arithmetic logic unit) 14 by way of a multiplexor 16. The multiplexor 16 is here operable to selectively provide 16-bit sequences, by way of the 16-line bus 18 to the ALU 14. A control input on the line 22 is provided to control operation of the mutliplexor 16.

The ALU 14 is further coupled, by way of a 16-line bus 24 to a programmable register 26. The ALU 14 is additionally coupled to receive clock pulses generated by a clock signal generator 28. While not separately shown, additional elements of the circuitry 10 are also coupled to receive clock pulses generated by the clock signal generator 28. In one embodiment, for instance, the control input generated on the line 22 and applied to the multiplexor 16 is formed of clock pulses generated by the clock signal generator 28.

The ALU 14 is operable, responsive to a first clock pulse to receive 16-bit values on the lines 18 and 24 and to add such values together to form a first summed value and to generate a carry-forward, here a single bit, value on the line 32 which is stored at a carry-forward bit register 34. The first summed value here forms the least significant bits of the output sequence stored in the output register 12, and is here generated on the line 36 to be stored therein.

Thereafter, responsive to a subsequent clock pulse generated by the clock signal generator 28, a second pair of 16-bit sequences are provided, by way of the lines 18 and 24, to the ALU 14. The ALU 14 further receives an indication, by way of the line 38 of the value of the carry-forward bit stored in the carry-forward bit register 34. The ALU then sums together the sequences provided thereto on the lines 18, 24, and 38 to form a 16-bit, second summed value together with a second carry-forward bit. The second summed value forms the middle significant bits of the 48-bit output sequence to be stored in the output register 12, here again generating the second sum of the value on the line 36 for storage in the output register 12.

The second carry-forward value generated together with the summation of the second set of input sequences to the ALU 14 is also generated on the line 32 for storage in the register 34.

Thereafter, responsive to a subsequent clock pulse generated by the clock signal generator 28, a third set of 16-bit input sequences are provided to the ALU 14 by way of the lines 18 and 24. The value of the second carry-forward bit stored in the register 34 is also provided to the ALU 14. The ALU 14 is operable to sum together the sequences provided thereto on the lines 18 and 24 and also the value of the second carry-forward bit provided thereto on the line 38, thereby to form a third summed value. The third summed value forms the most significant bits of the output sequence to be stored in the output register 12 and such most significant bits are provided thereto by way of the line 36. Thereby, a 48-bit output sequence is formed responsive to 16-bit input sequences provided to the ALU 14. The time period required to generate such an output sequence is dependent upon the clock speed at which the clock pulses are generated by the clock signal generator 28.

FIG. 2 illustrates the circuitry 10 of another embodiment of the present invention. Similar to the circuitry 10 shown in FIG. 1, the embodiment shown in FIG. 2 again includes an output register 12, ALU 14, multiplexor 16, programmable register 26, and carry-forward bit register 34. And, the ALU 14 is again coupled to receive 16-bit input sequences on the lines 18 and 24, respectively. The clock signal generator 28 again generates clock pulses, responsive to which the ALU 14 is operable.

The embodiment of the circuitry 10 shown in FIG. 2 further includes a second output register 44. The second output register 44 is also coupled to the multiplexor 16, and the multiplexor 16 is further operable selectively to provide values of the sequences stored in the second output register 44 on the lines 18 to the ALU 14.

The circuitry 10 of the embodiment shown in FIG. 2 further includes a logic gate 48 coupled in line with the carry-forward bit register 44. The logic gate 48 is further selectively coupled to a logical "one" value by way of the line 52. A circuit device functionally equivalent to the switch 54 shown in the Figure controls whether the logical "one" value is applied to the logic gate 48. When the circuit device 54 is in a closed position, the value generated on the line 38 and applied to the ALU 14 is caused to be of the logical "one" value. Otherwise, the value generated on the line 38 and applied to the ALU 14 corresponds to the value stored in the carry-forward bit register 34.

The embodiment of the circuitry 10 shown in FIG. 2 is operable both to generate the 48-bit output sequence in the manner by which the 48-bit output sequence is generated by the circuitry 10 of the embodiment shown in FIG. 1 and also to generate a 16-bit output sequence to be stored in the second output register 44. The 16-bit generated and stored in the output register 44 is accessible to be used, for instance, to form a data pointer used during operation of a computer system.

In the embodiment of the circuitry 10 shown in FIG. 2, a programmable inverter 56 is further positioned in line between the programmable register 26 and the lines 24 coupled to the ALU 14. In the exemplary embodiment, the inverter is formed of a series of XOR (exclusive gates). While the inverter 56 is shown for purposes of explanation of the embodiment of the circuitry 10 shown in FIG. 2, the functions of the inverter 56 can instead, for instance, be provided through operation of the programmable register to invert the values stored in the register.

Again, responsive to a clock pulse generated by the clock signal generator 28, 16-bit sequences are provided by way of the lines 18 and 24 to the ALU 14. During operation of this embodiment of the present invention, when the 16-bit output sequences are to be generated and stored at the second output register 44, the circuit device 54 is positioned in a closed position so that a logical "one" value is applied to the ALU 14 by way of the line 38. The ALU 14 is operable to add the values provided thereto by way of the lines 18, 24, and 38.

Because the values applied to the ALU by way of the lines 24 are inverted, the operation performed by the ALU is equivalent to a subtraction of the non-inverted values of the programmable register 26 from the values of the sequence applied to the ALU by way of the lines 18. That is to say, adding a value of 1, generated on the line 38, together with the sequence generated on the lines 18 and the inverses of the values of the sequence stored in the programmable register 26 is equivalent to subtracting the value stored in the register 26 from the values of the sequence generated on the line 18. Once the ALU 14 generates the resultant sequence, the values thereof are generated on the line 36 to be stored at the output register 44. Values of the output register 44 are also selectably passed by the multiplexor 16 to be provided to the ALU 14 by way of the lines 18.

The circuitry 10 as shown in the embodiment illustrated in FIG. 2, advantageously utilizes the same circuitry to generate both a 48-bit output sequence and a 16-bit output sequence to be used, for instance, as an address pointer and a data pointer, respectively. Because the same circuitry is utilized to generate both sequences, the size of the circuitry required to generate such sequences is reduced relative to conventional apparatus.

FIG. 3 illustrates a computer system, shown generally at 58, in which an embodiment of the present invention is operable. The computer system 58 is here shown to include a plurality of CPUs (central processor units) 62 connected together by way of a processor bus 64. A bus interface 66 connects the CPUs 62 with a peripheral bus, here a 1394 bus 68.

The computer system 58 further includes an additional peripheral bus, here an ATA bus 72 which is coupled to the 1394 bus 68 by way of a bridge 74. The bridge includes the circuitry 10 constructed according to an embodiment of the present invention. Peripheral devices coupled to the respective buses 68 and 72, for purposes of simplicity, are not shown.

FIG. 4 illustrates a method, shown generally at 82, of an embodiment of the present invention. The method 82 generates at least a first multi-bit output sequence of a first selected number of bits.

First, and as indicated by the block 84, a first iteration of an input sequence is added to a data sequence. The input sequence and the data sequence are each of a second selected number of bits wherein the first selected number of bits is a multiple of the second selected number of bits. When the first iteration of the input sequence is added to the data sequence, a first summed value and a first carry-forward value is formed. Next, and as indicated by the block 86, a second iteration of the input sequence is added at least to the first carry-forward value to form a second summed value. Then, and as indicated by the block 88, the first summed value is concatenated to the at least the second summed value to form a concatenated sequence. And, as indicated by the block 92, the first multi-bit output sequence is generated responsive to the concatenated sequence.

Operation of an embodiment of the present invention thereby advantageously provides a manner by which to generate a sequence of bits which is a multiple of sequences of input bits. Only a single cycle path is required to effectuate the generation of the output sequence, thereby avoiding the complexity associated with multi-cycle paths conventionally required to implement generation of a lengthy multi-bit sequence.

The previous descriptions are of preferred examples for implementing the invention, and the scope of the invention should not necessarily be limited by this description. The scope of the present invention is defined by the following claims.

What is claimed is:

1. In synthesized logic apparatus used in data processing, an improvement of circuitry for generating at least a first multi-bit output sequence of a first selected number of bits responsive to an input sequence of a second selected number of bits, the first selected number of bits comprise a multiple of the second selected number of bits, said circuitry comprising:

an arithmetic logic unit coupled to receive (i) the input sequence comprising a first iteration and a second iteration and (ii) a data sequence, the data sequence also of the second selected number of bits, said arithmetic logic unit for adding the first iteration of the input sequence together with the data sequence to form a first summed value and a first carry-forward value and thereafter at least for adding the second iteration of the input sequence at least with the first carry-forward value to form a second summed value, the first summed value concatenated to the second summed value to form the first multi-bit output sequence.

2. The circuitry of claim 1 wherein said arithmetic logic unit forms the second summed value by adding together the second iteration of the input sequence, the first carry-forward value, and the data sequence.

3. The circuitry of claim 2 wherein said arithmetic logic unit forms the third summed value by adding together the third iteration of the input sequence, the second carry-forward value, and the data sequence.

4. The circuitry of claim 1 further comprising a carry-forward register for storing the first carry-forward value therein, said arithmetic logic unit further for retrieving the first carry-forward value from said carry-forward register to add the first carry-forward value together with at least the second iteration of the input sequence to form the second summed value.

5. The circuitry of claim 1 wherein said arithmetic logic unit is further coupled to receive a third iteration of the input sequence, said arithmetic logic unit further for forming a second carry-forward and for adding the third iteration of the input sequence with at least the second carry-forward value to form a third summed value, the second summed value and the first summed value concatenated to the third summed value to form the first multi-bit output sequence.

6. The circuitry of claim 4 wherein the first multi-bit output sequence of the first selected number of bits is of a 48-bit, bit length, wherein the input sequence of the second selected number of bits is of a 16-bit, bit length, and wherein the first summed value, the second summed value, and the third summed value formed by said arithmetic logic unit are each of 16-bit, bit lengths.

7. The circuitry of claim 1 further comprising a first output register coupled to receive the first multi-bit output sequence, said first output register for storing the multi-bit output sequence therein.

8. The circuitry of claim 7 wherein the input sequence of the second selected number of bits is selected from values stored in said first output register.

9. The circuitry of claim 8 further comprising a multiplexor coupled between said first output register and said arithmetic logic unit, said multiplexor for selectively providing selected ones of the values stored in said first output register to said arithmetic logic unit.

10. The circuitry of claim 1 further for generating a second multi-bit output sequence, the second multi-bit output sequence of the second selected number of bits to correspond in number with that of the input sequence, said arithmetic logic unit further for subtracting the data sequence form the input sequence, thereby to form the second multi-bit output sequence.

11. The circuitry of claim 10 further comprising a second output register coupled to receive the second multi-bit output sequence, said second output register for storing the second multi-bit output sequence therein.

12. The circuitry of claim 10 further comprising at least one exclusive or gate coupled to receive the data sequence, said inverter for inverting the data sequence, and wherein subtraction of the data sequence from the input sequence by said arithmetic logic unit is performed by adding together the data sequence, once inverted, together with the input sequence and incrementing a summed value formed therefrom by a unity value.

13. The circuitry of claim 12 wherein the input sequence of the second selected number of bits is further selectively formed of values stored in the second output register.

14. The circuitry of claim 1 further comprising a programmable register, said programmable register for selecting values of, and for storing therein values forming the data sequence.

15. A method for generating at least a first multi-bit output sequence of a first selected number of bits, said method comprising the steps of:

receiving (i) an input sequence and (ii) a data sequence;

adding a first iteration of the input sequence to the data sequence, the input sequence and the data sequence each of a second selected number of bits, wherein the first selected number of bits comprises a multiple of the second number of bits, to form a first summed value and a first carry-forward value;

adding a second iteration of the input sequence to at least the first carry-forward value to form a second summed value;

concatenating the first summed value to the at least the second summed value to form a concatenated sequence; and generating the first multi-bit output sequence responsive to the concatenated sequence generated during said step of concatenating.

16. The method of claim 15 wherein a second carry-forward value is further generated during said step of adding the second iteration of the input sequence, wherein said method comprises the additional step, subsequent to said step of adding the second iteration of the input sequence, of adding a third iteration of the input sequence at least to the second carry-forward value to form a third summed value, and wherein said step of concatenating further comprises concatenating the second summed sequence to the third summed sequence.

17. The method of claim 15 further for generating a second multi-bit output sequence of the second selected number of bits, said method further comprising the steps of:

subtracting the data sequence from the first iteration of the input sequence, a resultant formed therefrom forming the second multi-bit output sequence.

* * * * *